United States Patent
Cao et al.

(10) Patent No.: US 12,511,461 B2
(45) Date of Patent: Dec. 30, 2025

(54) NEAR-THRESHOLD CELL CIRCUIT DELAY MODEL

(71) Applicant: SOUTHEAST UNIVERSITY, Nanjing (CN)

(72) Inventors: Peng Cao, Nanjing (CN); Bingqian Xu, Nanjing (CN); Haiyang Jiang, Nanjing (CN); Qianqian Song, Nanjing (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 720 days.

(21) Appl. No.: 17/796,794

(22) PCT Filed: Mar. 10, 2022

(86) PCT No.: PCT/CN2022/080128
§ 371 (c)(1),
(2) Date: Aug. 1, 2022

(87) PCT Pub. No.: WO2022/257517
PCT Pub. Date: Dec. 15, 2022

(65) Prior Publication Data
US 2023/0153501 A1    May 18, 2023

(30) Foreign Application Priority Data
Jun. 7, 2021    (CN) .......................... 202110631631.3

(51) Int. Cl.
*G06F 30/3312*    (2020.01)
*G06F 30/3315*    (2020.01)
(Continued)

(52) U.S. Cl.
CPC ...... *G06F 30/3312* (2020.01); *G06F 30/3315* (2020.01); *G06F 30/337* (2020.01);
(Continued)

(58) Field of Classification Search
CPC ............ G06F 30/3312; G06F 30/3315; G06F 30/337; G06F 30/367; G06F 30/373; G06F 30/398; G06F 2119/06; G06F 2119/12
(Continued)

(56) References Cited

U.S. PATENT DOCUMENTS 7,042,266 B2 *    5/2006   Takahashi  ..............   H03K 5/133
                                                         327/284
7,127,385 B2 *   10/2006   Komoda  .................   G06F 30/33
                                                         716/108
(Continued)

FOREIGN PATENT DOCUMENTS

CN      107403052 A  *  11/2017   .............  G06F 30/30
CN      110135098 A      8/2019
(Continued)

OTHER PUBLICATIONS

He et al., Chinese Patent Application No. CN-107403052-B, published Nov. 28, 2017, 3 pages including abstract and 1 drawing. (Year: 2017).*

(Continued)

*Primary Examiner* — Phallaka Kik
(74) *Attorney, Agent, or Firm* — MUNCY, GEISSLER, OLDS & LOWE, P.C.

(57) ABSTRACT

Disclosed is a near-threshold cell circuit delay model, where obtaining parameters includes obtaining process parameters, current parameters and delay parameters with slow input transition; judging a cell circuit type includes judging whether a cell circuit is an inverter, a stacked structure cell or a parallel structure cell, calculating currents and a current integral according to the cell circuit type, calculating a mean value, a variance and a skewness of a logarithm of the current sum, and calculating a mean value and a variance of an equivalent threshold voltage; judging a delay type (Continued)

includes calculating an overshoot time and a delay according to the cell circuit type, comparing the magnitude relationship among an input transition time, the overshoot time and the delay, and judging whether the delay type is ultra-fast input, fast input or slow input; establishing a cell circuit nominal delay model is establishing the cell circuit nominal delay model according to the cell circuit type and the delay type, and obtaining a nominal delay value; and establishing a cell circuit statistical delay model is establishing the cell circuit statistical delay model according to the cell circuit type and the delay type.

10 Claims, 2 Drawing Sheets

(51) Int. Cl.
  *G06F 30/337*  (2020.01)
  *G06F 30/367*  (2020.01)
  *G06F 30/373*  (2020.01)
  *G06F 30/398*  (2020.01)
  *G06F 119/06*  (2020.01)
  *G06F 119/12*  (2020.01)

(52) U.S. Cl.
  CPC .......... *G06F 30/367* (2020.01); *G06F 30/373* (2020.01); *G06F 30/398* (2020.01); *G06F 2119/06* (2020.01); *G06F 2119/12* (2020.01)

(58) Field of Classification Search
  USPC ................... 716/108, 113, 134, 136; 703/14
  See application file for complete search history.

(56) References Cited

U.S. PATENT DOCUMENTS

| | | | | |
|---|---|---|---|---|
| 7,525,373 | B1* | 4/2009 | Ogilvie | G06F 1/3203 716/113 |
| 8,972,917 | B1* | 3/2015 | Lu | G06F 30/367 716/112 |
| 2002/0077799 | A1* | 6/2002 | Komoda | G06F 30/33 703/19 |
| 2011/0181343 | A1* | 7/2011 | Myers | H03K 19/0016 327/365 |
| 2011/0314433 | A1* | 12/2011 | Onodera | G06F 30/3312 716/113 |
| 2014/0043078 | A1* | 2/2014 | Pancholi | G06F 30/30 716/133 |
| 2018/0137225 | A1* | 5/2018 | Joo | G06F 30/367 |

FOREIGN PATENT DOCUMENTS

| | | | | |
|---|---|---|---|---|
| CN | 111404541 | A | | 7/2020 |
| CN | 110442926 | B | * 11/2020 | ......... G06F 30/3312 |
| CN | 112470326 | A | * 3/2021 | ............ B60L 3/0046 |
| CN | 113300693 | A | | 8/2021 |
| JP | H0877240 | A | * 3/1996 | ......... G06F 17/5045 |

OTHER PUBLICATIONS

Chen et al., Chinese Patent Application No. CN-110135098-A, published Aug. 16, 2019, 3 pages including abstract, claims and 1 drawing. (Year: 2019).*

* cited by examiner

NEAR-THRESHOLD CELL CIRCUIT DELAY MODEL

TECHNICAL FIELD

The present invention relates to the field of integrated circuit design, and particularly relates to a near-threshold cell circuit delay model.

BACKGROUND

With the rise of low power consumption technologies such as the Internet of Things, how to improve the circuit performance under low power consumption has become a key issue in the development of integrated circuits. One of the effective means to reduce power consumption is reducing a supply voltage. Due to the energy efficiency advantages, the design and research of near-threshold circuits have received extensive attention.

A near-threshold cell circuit delay model is of great significance for studying the timing information of a circuit in the early design stage, and can quickly predict the delay of a cell circuit in different scenarios. For the near-threshold cell circuit delay model, the current method in the industry is a look-up table method, that is, a look-up table is obtained by simulation, and then, the look-up table is interpolated to obtain a cell delay. However, the establishment of the look-up table requires a lot of simulation, so that the time cost is high. Therefore, a fast and accurate near-threshold cell circuit delay model needs to be established. The challenges in establishing the near-threshold cell circuit delay model can be mainly divided into two aspects: first, an input transition time causes the nonlinear change of the delay, so the linear and nonlinear relationships between the delay and the input transition time need to be modeled respectively. However, a current equation in near-threshold domain is complex, which makes an integral-based modeling method at nominal voltage no longer applicable; secondly, due to the nonlinear relationship between the cell delay and process parameters, the cell delay in near threshold follows non-Gaussian distribution, which makes the original cell delay model based on Gaussian distribution no longer applicable. Therefore, a fast and accurate near-threshold cell circuit delay model needs to be established so as to reduce the simulation cost as much as possible on the premise of ensuring the accuracy. At present, a cell circuit delay model based on an equivalent current method is only for the case of a specific input transition time, and does not fully consider the influence of the input transition time on the delay.

SUMMARY

Technical problems: An objective of the present invention is to establish a fast and accurate near-threshold cell circuit delay model considering an input transition time. A nominal delay model and a statistical delay model of an inverter and a composite cell are obtained by an equivalent current method and the properties of logarithm skewed normal distribution. The present invention has the advantages of high accuracy and low time cost.

Technical solution: In order to achieve the objective, a near-threshold cell circuit delay model of the present invention adopts the following technical solution:

A cell circuit includes inverters, stacked structure cells and parallel structure cells, and the model includes the following steps:

S1: obtaining parameters, including process parameters of each transistor of the cell circuit, cell circuit parameters and delay parameters with slow input transition;

S2: judging a cell circuit type, including judging whether the cell circuit is the inverter, the stacked structure cell or the parallel structure cell, calculating a high current, a low current and a current integral of the cell circuit according to the cell circuit type, calculating a mean value, a variance and a skewness of a natural logarithm of the sum of the high current and the low current, and calculating a mean value and a variance of an equivalent threshold voltage;

S3: judging a delay type, calculating an overshoot time and a delay of the cell circuit according to the cell circuit type obtained in step S2, and then, judging whether the delay type is ultra-fast input transition, fast input transition or slow input transition according to the relative magnitude relationship among the overshoot time, the delay and an input transition time; if the overshoot time is greater than the input transition time, determining the delay type as the ultra-fast input transition; if the overshoot time is less than the input transition time and the delay is greater than half of the input transition time, determining the delay type as the fast input transition; if the overshoot time is less than the input transition time and the delay is less than half of the input transition time, determining the delay type as the slow input transition;

S4: establishing a cell circuit nominal delay model according to the cell circuit type obtained in step S2 and the delay type obtained in step S3, and obtaining a nominal delay;

S5: based on the nominal delay model, establishing the cell circuit statistical delay model according to the cell circuit type obtained in step S2 and the delay type obtained in step S3, and obtaining delay statistics: a variance, a maximum value and a minimum value.

Where:

in step S1, the process parameters include a sub-threshold slope factor and a drain-induced source barrier lowering effect coefficient, the circuit parameters include a transistor size, a load, the input transition time, a power supply voltage, a temperature and process, the delay parameters of slow input transition include fitting parameters a and b in Equation (1) and fitting parameters c and d in Equation (2), and the fitting parameters a, b, c and d are obtained by fitting the delay under the slow input transition obtained by simulation, $$\frac{td}{\tau} = a\ln\frac{td_s}{\tau} + b \quad (1)$$

$$a = cV_{th} + d \quad (2)$$

where in Equation (1), td represents a cell circuit delay, $\tau$ represents the input transition time, and $td_s$ represents a step delay; and in Equation (2), $V_{th}$ represents a threshold voltage.

In step S2, if the cell circuit is the inverter, step S2 includes:

S21: calculating a high current $I_H$, a low current $I_L$ and a current integral k of the cell circuit by Equation (3), where in the case of the ultra-fast input transition, the high current $I_H$ is a high current $I_{H1}$ under the ultra-fast input transition, which is a source-drain current when a gate-source voltage and a source-drain voltage are both power supply voltages; in the case of the fast input transition, the high current $I_H$ is the high current $I_{H2}$ under the fast input transition, which is a source-drain current when the gate-source voltage is a power supply voltage and the source-drain voltage is a source-drain voltage at the input transition time;

$$\begin{cases} I_{H1} = I_{ds}(V_{gs} = V_{dd}, V_{ds} = V_{dd}) \\ I_{H2} = I_{ds}(V_{gs} = V_{dd}, V_{ds} = V_{ds}(\tau)) \\ I_L = I_{ds}\left(V_{gs} = V_{dd}, V_{ds} = \frac{V_{dd}}{2}\right) \\ k = \int_0^1 I_0 K_0 e^{K_1\left(\frac{V_{dd}x - V_{th} + \lambda V_{dd}}{n\phi_t}\right) + K_2\left(\frac{V_{dd}x - V_{th} + \lambda V_{dd}}{n\phi_t}\right)^2} dx \end{cases} \quad (3)$$

in Equation 3, $V_{gs}$ and $V_{ds}$ represent a gate-source voltage and a source-drain voltage, $I_{ds}$ represents a source-drain current, $V_{dd}$ represents a power supply voltage, $V_{ds}(\tau)$ represents a source-drain voltage at the input transition time and is calculated by Equation (4), $\lambda$ represents a drain-induced source barrier lowering effect coefficient, $n$ represents a sub-threshold slope factor, $\Phi_t$ represents a thermal voltage. $I_0$ represents a parameter affected by the process parameters, and $K_0$, $K_1$ and $K_2$ represent fitting coefficients determined by the process;

$$V_{ds}(\tau) = \frac{C_M}{C_M + C_L} V_{dd} - \frac{k}{C_M + C_L} + V_{dd} \quad (4)$$

in Equation (4), $C_M$ represents a coupling capacitance of input and output, and $C_L$ represents a load capacitance;

S22: expressing a natural logarithm Y of the current sum, that is, a natural logarithm of the sum of the high current and the low current, namely $I_H + I_L$, as Equation (5), and calculating a mean value $\mu_Y$, a variance $\sigma_Y^2$ and a skewness $\gamma_1$ of the logarithm Y of the current sum by Equation (6), $$Y = -\ln(I_H + I_L) \quad (5)$$

$$\begin{cases} \mu_Y = -k_2 E(\Delta V_{th}^2) + mE(\Delta V_{th}) - \ln(I_h + I_L) \\ \sigma_Y^2 = k_2^2\left(E(\Delta V_{th'}^4) - E(\Delta V_{th'}^2)^2\right) \\ \gamma_1 = \left\{\begin{aligned} &-k_2^3 E(\Delta V_{th'}^6) + 3k_2^2 E(\Delta V_{th'}^4)\left[\frac{m^2}{4k_2} - \ln(I_H + I_L)\right] - \\ &3k_2 E(\Delta V_{th'}^2)\left[\frac{m^2}{4k_2} - \ln(I_H + I_L)\right]^2 + \\ &\left[\frac{m^2}{4k_2} - \ln(I_H + I_L)\right]^3 - 3\mu_Y \sigma_Y^2 - \mu_Y^3 \end{aligned}\right\} / \sigma_Y^3 \end{cases} \quad (6)$$

where in Equation (6), m is calculated by Equation (7) under the ultra-fast input, m is calculated by Equation (8) under the fast input, $k_2$ represents a fitting coefficient determined by the process, $\Delta V^{th}$ represents a threshold voltage fluctuation quantity, $\Delta V^{th'}$ is calculated by Equation (9), and $E[\cdot]$ represents a mean value of a corresponding random variable;

$$m = k_1 + 2k_2(V_{dd} - V_{th0} + \lambda V_{dd}/2) + \frac{I_H}{I_H + I_L} k_2 \lambda V_{dd} \quad (7)$$

in Equation (7), $k_1$ represents a fitting coefficient determined by the process, and $V_{th0}$ represents a nominal value of threshold voltage.

$$m = k_1 + 2k_2(V_{dd} - V_{th0} + \lambda V_{dd}/2) + \frac{I_H}{I_H + I_L} k_2 \lambda [2V_{ds}(\tau) - V_{dd}] \quad (8)$$

$$\Delta V_{th'} = \Delta V_{th} - \frac{m}{2k_2}. \quad (9)$$

In step S2, if the cell circuit is the stacked structure cell, S2 includes:

S21: calculating a high current $I_{H1}$ under the ultra-fast input and a high current $I_{H2}$ under the fast input, a low current $I_L$ and a current integral k by Equation (10), $$\begin{cases} I_{H1} = I_{ds}(V_g = V_{dd}, V_d = V_{dd}, V_s = V_{XH1}) \\ I_{H2} = I_{ds}(V_g = V_{dd}, V_d = V_d(\tau), V_s = V_{XH2}) \\ I_L = I_{ds}\left(V_g = V_{dd}, V_d = \frac{V_{dd}}{2}, V_s = V_{XL}\right) \\ k = \int_0^{0.5} I_0 K_0 e^{k_1(V_{dd}x - V_{th} + \lambda V_{dd}) + k_2(V_{dd}x - V_{th} + \lambda V_{dd})^2} dx + \\ \int_{0.5}^1 I_0 K_0 e^{k_1\left(V_{dd}x - V_{th} - 2V_{XH}\left(x - \frac{1}{2}\right) + \lambda V_{dd}\right) + k_2\left(V_{dd}x - V_{th} - 2V_{XH}\left(x - \frac{1}{2}\right) + \lambda V_{dd}\right)^2} dx \end{cases} \quad (10)$$

where in Equation (12) $V_g$ and $V_d$ represent a gate voltage and a drain voltage, $V_s$ represents a source voltage, $V_{XH}$ and $V_{XL}$ represent intermediate node voltages at different gate voltages and drain voltages, in the case of the ultra-fast input, $V_{XH}$ is $V_{XH1}$, which is an intermediate node voltage when the gate voltage and the drain voltage are both power supply voltages, in the case of the fast input, $V_{XH}$ is $V_{XH2}$, which is an intermediate node voltage when the gate voltage is a power supply voltage and the drain voltage is an intermediate node voltage of the drain voltage at the input transition time and is calculated by Equation (11), and $V_d(\tau)$ represents a drain voltage at the input transition time;

$$\begin{cases} V_{XH1} = \frac{V_{thD} - V_{thU} + \lambda V_{dd}}{(1 + 2\lambda)} + \\ \qquad \frac{\ln\left(\frac{W_U}{W_D}\right) - m_2}{(1 + 2\lambda)[k_1 + k_2(2V_{dd} - V_{thU} - V_{thD} + \lambda V_{dd})]} \\ V_{XH2} = \frac{V_{thD} - V_{thU} + \lambda V_d(\tau)}{(1 + 2\lambda)} + \\ \qquad \frac{\ln\left(\frac{W_U}{W_D}\right) - m_2}{(1 + 2\lambda)[k_1 + k_2(2V_{dd} - V_{thU} - V_{thD} + \lambda V_d(\tau))]} \\ V_{XL} = \frac{V_{thD} - V_{thU} + \lambda V_{dd}/2}{(1 + 2\lambda)} + \\ \qquad \frac{\ln\left(\frac{W_U}{W_D}\right) - m_2}{(1 + 2\lambda)[k_1 + k_2(2V_{dd} - V_{thU} - V_{thD} + \lambda V_{dd}/2)]} \end{cases} \quad (11)$$

in Equation (11), $V_{thU}$, and $V_{thD}$ respectively represent an upper transistor threshold voltage and a lower transistor threshold voltage in the stacked structure cell. $W_U$ and $W_D$ respectively represent an upper transistor width and a lower transistor width in the stacked structure cell, and $m_2$ represents a fitting coefficient;

S22: calculating a mean value E(Y), a variance D(Y) and a skewness $S_k(Y)$ of the logarithm Y of the current sum by Equation (12), $$\begin{cases} E(Y) = E(Y_1) + E(Y_2) \\ D(Y) = D(Y_1) + D(Y_2) + 2\text{Cov}(Y_1, Y_2) \\ S_k(Y) = \dfrac{S_k(Y_1)D(Y_1)^{3/2} + S_k(Y_2)D(Y_2)^{3/2} + 3\text{Cov}(Y_1, Y_2^2) + 3\text{Cov}(Y_1^2, Y_2) - 6E(Y)\text{Cov}(Y_1, Y_2)}{D(Y)^{3/2}} \end{cases} \quad (12)$$

where in Equation (12), D[·] represents a variance of a corresponding random variable, Sk[·] represents a skewness of the corresponding random variable, Cov[·] represents a covariance of the corresponding random variable, and $Y_1$ and $Y_2$ can be calculated by Equation (13);

$$\begin{cases} Y_1 = \left(-k_2 \Delta V_{thH}^2 + \Delta V_{thH} m - \ln(I_H + I_L)\right) \dfrac{I_H}{I_H + I_L} \\ Y_2 = \left(-k_2 \Delta V_{thL}^2 + \Delta V_{thL} m - \ln(I_H + I_L)\right) \dfrac{I_L}{I_H + I_L} \end{cases} \quad (13)$$

in Equation (13), $\Delta V_{thH}$ and $\Delta V_{thL}$ represent linear functions of an upper transistor threshold voltage fluctuation quantity $\Delta V_{thU}$ and a lower transistor threshold voltage fluctuation quantity $\Delta V_{thD}$, expressed as Equation (14), and $\alpha_1$, $\alpha_2$, $\alpha_3$ and $\alpha_4$ in Equation (14) represent coefficients;

$$\begin{cases} \Delta V_{thH} = (1 + \alpha_1)\Delta V_{thU} + \alpha_2 \Delta V_{thD} \\ \Delta V_{thL} = (1 + \alpha_3)\Delta V_{thU} + \alpha_4 \Delta V_{thD} \end{cases} \quad (14)$$

S23: calculating a mean value and a variance of an equivalent threshold voltage $\Delta V_{th\_eff}$ by Equation (15).

$$\Delta V_{th\_eff} = \dfrac{I_H}{I_H + I_L}\Delta V_{thH} + \dfrac{I_L}{I_H + I_L}\Delta V_{thL}. \quad (15)$$

In step S2, if the cell circuit is the parallel structure cell, S2 includes:

S21: calculating a high current $I_{H1}$ under the ultra-fast input and a high current $I_{H2}$ under the fast input, a low current $I_L$ and a current integral k by Equation (16), $$\begin{cases} I_{H1} = 2I_{ds}(V_{gs} = V_{dd}, V_{ds} = V_{dd}) \\ I_{H2} = 2I_{ds}(V_{gs} = V_{dd}, V_{ds} = V_{ds}(\tau)) \\ I_L = 2I_{ds}\left(V_{gs} = V_{dd}, V_{ds} = \dfrac{V_{dd}}{2}\right) \\ k = \int_0^1 I_0 K_0 e^{k_1(V_{dd}x - V_{th1} + \lambda V_{dd}) + k_2(V_{dd}x - V_{th1} + \lambda V_{dd})^2} dx + \\ \quad \int_0^1 I_0 K_0 e^{k_1(V_{dd}x - V_{th2} + \lambda V_{dd}) + k_2(V_{dd}x - V_{th2} + \lambda V_{dd})^2} dx \end{cases} \quad (16)$$

where in Equation (16), $V_{th1}$ and $V_{th2}$ respectively represent threshold voltages of a left transistor and a right transistor in the parallel structure;

S22: calculating a mean value E(Y), a variance D(Y) and a skewness $S_k(Y)$ of the logarithm Y of the current sum by Equation (17), $$\begin{cases} E(Y) = E(Y_1) + E(Y_2) \\ D(Y) = D(Y_1) + D(Y_2) \\ S_k(Y) = \dfrac{S_k(Y_1)D(Y_1)^{3/2} + S_k(Y_2)D(Y_2)^{3/2}}{D(Y)^{3/2}} \end{cases} \quad (17)$$

where in Equation (17), $Y_1$ and $Y_2$ can be calculated by Equation (18):

$$\begin{cases} Y_1 = \dfrac{1}{2}\left(-k_2 \Delta V_{th1}^2 + \Delta V_{th1} m - \ln(I_H + I_L)\right) \\ Y_2 = \dfrac{1}{2}\left(-k_2 \Delta V_{th2}^2 + \Delta V_{th2} m - \ln(I_H + I_L)\right) \end{cases} \quad (18)$$

in Equation (18), $\Delta V_{th1}$ and $\Delta V_{th2}$ represent threshold voltage fluctuation quantities of the left transistor and the right transistor in the parallel structure;

S23: calculating a mean value and a variance of an equivalent threshold voltage $\Delta V_{th\_eff}$ by Equation (19).

$$\Delta V_{th\_eff} = \dfrac{\Delta V_{th1} + \Delta V_{th2}}{2} \quad (19)$$

The step S3 to determine the delay type includes calculating an overshoot time $t_{ov}$ and a delay td according to the cell circuit type, comparing the magnitude relationship among the input transition time, the overshoot time and the delay, and judging whether the input is ultra-fast input, fast input or slow input, and specifically includes:

S31: substituting the high current $I_{H1}$ under the ultra-fast input and the high current $I_{H2}$ under the fast input, the low current $I_L$ and the current integral k obtained in step S2 into Equation (20) to calculate the overshoot time $t_{ov}$, and substituting the variables into Equation 21 to calculate the delay td;

$$t_{ov} = \dfrac{2C_M}{C_M + C_L}\dfrac{C_L V_{dd}}{I_{H1} + I_L} + \left(1 - \dfrac{2C_L}{C_M + C_L}\dfrac{k}{I_{H1} + I_L}\right)\tau \quad (20)$$

$$td = \left(1 + \dfrac{2C_M}{C_M + C_L}\right)\dfrac{C_L V_{dd}}{I_{H2} + I_L} + \left(\dfrac{1}{2} - \dfrac{2C_L}{C_M + C_L}\dfrac{k}{I_{H2} + I_L}\right)\tau \quad (21)$$

S32: comparing the overshoot time $t_{ov}$ with the input transition time $\tau$, if $t_{ov} > \tau$, determining the input as the ultra-fast input, otherwise, determining the input as the fast input or the slow input;

S33: comparing the delay td with half of the input transition time $\tau/2$, if $td > \tau/2$, determining the input as the fast input, otherwise, determining the input as the slow input.

In step S4, establishing the cell circuit nominal delay model includes obtaining a nominal delay according to the cell circuit type and the delay type, where if the delay type is the ultra-fast input, the nominal delay is calculated by Equation (22); if the delay type is the fast input, the nominal delay is calculated by Equation (21); and if the delay type is the slow input, the nominal delay is calculated by Equation (1).

$$td = \left(1 + \dfrac{2C_M}{C_M + C_L}\right)\dfrac{C_L V_{dd}}{I_{H1} + I_L} + \left(\dfrac{1}{2} - \dfrac{2C_L}{C_M + C_L}\dfrac{k}{I_{H1} + I_L}\right)\tau. \quad (22)$$

In S5, establishing the cell circuit statistical delay model includes obtaining delay statistics: a variance, a maximum value and a minimum value based on the nominal delay model in step S4 according to the cell circuit type and the delay type, where if the delay type is the ultra-fast input, step S5 includes:

S51: based on the properties of logarithm skewed normal distribution, substituting the mean value $\mu_Y$, the variance $\sigma_Y^2$ and the skewness $\gamma_1$ of the logarithm of the current sum obtained in step S2 into Equation (23) to calculate distribution parameters: a location parameter $\xi_Y$, a scale parameter $\omega_Y$ and a second shape parameter $\beta_Y$ $$\begin{cases} \varepsilon_Y = \mu_Y - \omega_Y \beta_Y \sqrt{\dfrac{2}{\pi}} \\ \omega_Y = \sqrt{\dfrac{\sigma_Y^2}{1 - \dfrac{2}{\pi}\beta_Y^2}} \\ \beta_Y = \sqrt{\dfrac{\pi}{2} \dfrac{\left(\dfrac{2\gamma_1}{4-\pi}\right)^{\frac{2}{3}}}{1 + \left(\dfrac{2\gamma_1}{4-\pi}\right)^{\frac{2}{3}}}} \end{cases} \quad (23)$$

S52: based on the distribution parameters, calculating a variance D(td) of the delay by Equation (24), and calculating a maximum value $td_{max}$ and a minimum value $td_{min}$ of the delay by Equation (25), $$D(td) = \left[\left(1 + \dfrac{2C_M}{C_M + C_L}\right)C_L V_{dd}\right]^2 \times 2e^{2\varepsilon_Y} e^{\omega_Y^2}\left(e^{\omega_Y^2}(2\beta_Y\omega_Y) - 2\phi^2(\beta_Y\omega_Y)\right) \quad (24)$$

$$\begin{cases} td_{max} = \left(1 + \dfrac{2C_M}{C_M + C_L}\right)C_L V_{dd} e^{\varepsilon_Y + 3.21\omega_Y} + M\tau \\ td_{min} = \left(1 + \dfrac{2C_M}{C_M + C_L}\right)C_L V_{dd} e^{\varepsilon_Y - 1.79\omega_Y} + M\tau \end{cases} \quad (25)$$

wherein Equation (24) and Equation (25), $\varphi(\cdot)$ represents a cumulative density distribution function of standard normal distribution.

In step S2, if the delay type is the fast input, S5 includes:

S51: based on the properties of logarithm skewed normal distribution, substituting the mean value $\mu_Y$, the variance $\sigma_Y^2$ and the skewness $Y_1$ of the logarithm of the current sum obtained in step S2 into Equation (23) to calculate distribution parameters: a location parameter $\xi_Y$, a scale parameter $\omega_Y$ and a second shape parameter $\beta_Y$;

S52: based on the distribution parameters, calculating a variance D(td) of the delay by Equation (24), and calculating a maximum value $td_{max}$ and a minimum value $td_{min}$ of the delay by Equation (25).

In step S2, if the delay type is the slow input, S5 includes:

S51: based on the mean value and the variance of the equivalent threshold voltage obtained in step S2, calculating a mean value E(td), a variance D(td) and a skewness $S_k(td)$ of the delay by Equation (26), $$\begin{cases} E(td) = p_2 E(\Delta V_{th}^2) + p_0 \\ D(td) = p_3^2 E(\Delta V_{th}^6) + (2p_3 p_1 + p_2^2)E(\Delta V_{th}^4) + \\ \qquad (2p_2 p_0 + p_1^2)E(\Delta V_{th}^2) + p_0^2 \\ \qquad q_8(\Delta V_{th}^8) + q_6 E(\Delta V_{th}^6) + q_4 E(\Delta V_{th}^4) + q_2 E(\Delta V_{th}^2) + \\ S_k(td) = \dfrac{q_0 - 3E(td)D(td) - E(td)^3}{D(td)^{3/2}} \end{cases} \quad (26)$$

where in Equation (26), $p_i$ and $q_i$ represent coefficients, which are functions of threshold voltages and currents;

S52: based on the properties of skewed normal distribution, calculating distribution parameters: a location parameter $\xi_{td}$, a scale parameter $\omega_{td}$ and a second shape parameter $\beta_{td}$ of the delay by Equation (23);

S53: based on the distribution parameters, calculating a maximum value $td_{max}$ and a minimum value $td_{min}$ of the delay by Equation (27).

$$\begin{cases} td_{max} = \varepsilon_{td} + 3.21\omega_{td} \\ td_{min} = \varepsilon_{td} - 1.79\omega_{td} \end{cases} \quad (27)$$

Beneficial effects: The present invention discloses a near-threshold cell circuit delay model considering an input transition time. A nominal delay model and a statistical delay model of an inverter and a composite cell are obtained by an equivalent current method and the properties of logarithm skewed normal distribution. The present invention has the advantages of high accuracy and low time cost. Under the SMIC40nm technology, compared with a Monte Carlo simulation method, the error of the nominal delay of the inverter is less than 5.55%, the error of the variance of the delay is less than 14.87%, the error of the $-3\sigma$ value is less than 15.16%, and the error of the $+3\sigma$ value is less than 10.87%; the error of the nominal delay of the stacked structure cell is less than 10.78%, the error of the variance is less than 16.43%, the error of the $-3\sigma$ value is less than 19.34%, and the error of the $+3\sigma$ value is less than 14.91%; and the error of the nominal delay of the parallel structure cell is less than 7.31%, the error of the variance is less than 15.91%, the error of the $-3\sigma$ value is less than 9.78%, and the error of the $+3\sigma$ value is less than 9.63%.

DETAILED DESCRIPTION

The technical solution of the present invention will be further introduced below in conjunction with a specific embodiment based on the SMIC40nm technology.

Figure 1:
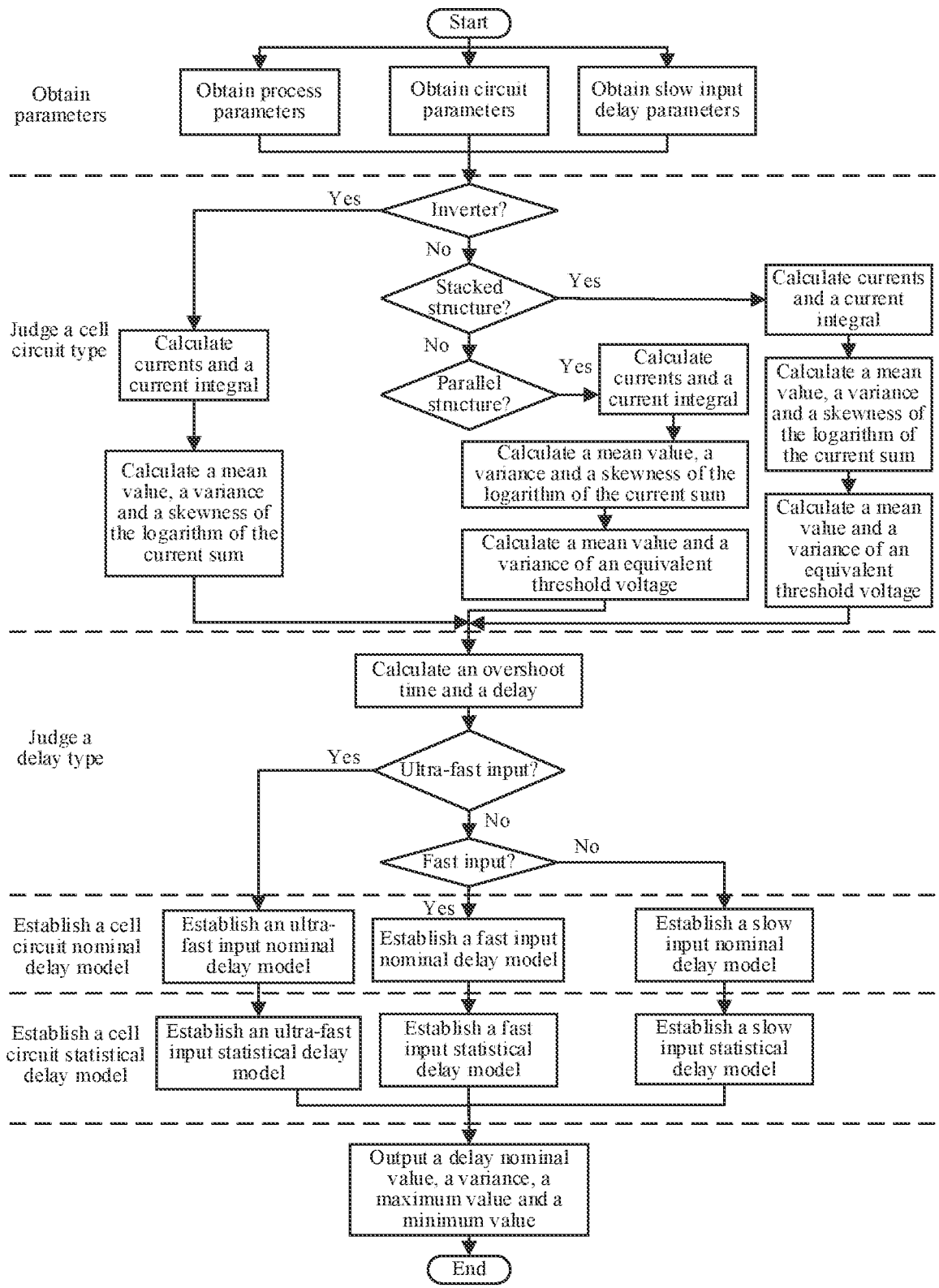
FIG. 1 shows a flow diagram of a near-threshold cell circuit delay model in a specific embodiment of the present invention.

FIG. 1 shows a flow diagram of a near-threshold cell circuit delay model in a specific embodiment of the present invention. Main steps are as follows:

S1: Parameters are obtained. The parameters include process parameters of each transistor of a cell circuit, cell circuit parameters and delay parameters with slow input transition. The process parameters of each transistor of the cell circuit include a sub-threshold slope factor and a drain-induced source barrier lowering effect coefficient, which are obtained by performing nominal direct-current simulation on a transistor with a minimum size. The cell circuit parameters include a transistor size, a load, an input transition time, a power supply voltage, temperature and process; the transistor size is a minimum size, the load is 1 fF, the input transition time is 50 ps, 500 ps and 1 ns, the power supply voltage is 0.4V, the temperature is 25° C., and the process corner is TT. The delay parameters with slow input transition include the slow input delay expression, which can be obtained by fitting the delay under the slow input obtained by simulation.

S2: A cell circuit type is judged. Whether the cell circuit is an inverter, a stacked structure cell or a parallel structure cell is judged, a high current $I_{H1}$ under the ultra-fast input and a high current $I_{H2}$ under the fast input, a low current $I_L$ and a current integral k are calculated according to the cell circuit type, a mean value $\mu_Y$, a variance $\sigma_Y^2$ and a skewness $\gamma_1$ of a logarithm Y of the sum of the high current and the low current are calculated, and a mean value and a variance of an equivalent threshold voltage are calculated. If the cell circuit type is inverter, the process parameters and the circuit parameters are substituted into Equation (1) and Equation (2) to respectively obtain a high current $I_{H1}$ under the ultra-fast input, a high current $I_{H2}$ under the fast input, a low current $I_L$ and a current integral k, and a mean value $\mu_Y$, a variance $\sigma_Y^2$ and a skewness $\gamma_1$ of the logarithm Y of the current sum. If the cell circuit type is the stacked structure cell, the process parameters and the circuit parameters are substituted into Equation (3), Equation (4) and Equation (5) to respectively obtain a high current $I_{H1}$ under the ultra-fast input, a high current $I_{H2}$ under the fast input, a low current $I_L$ and a current integral k, a mean value $\mu_Y$, a variance $\sigma_Y^2$ and a skewness $\gamma_1$ of the logarithm Y of the current sum, and a mean value and a variance of the equivalent threshold voltage. If the cell circuit type is the parallel structure cell, the process parameters and the circuit parameters are substituted into Equation (6), Equation (7) and Equation (8) to respectively obtain a high current $I_{H1}$ under the ultra-fast input, a high current $I_{H2}$ under the fast input, a low current $I_L$ and a current integral k, a mean value $\mu_Y$, a variance $\sigma_Y^2$ and a skewness $\gamma_1$ of the logarithm Y of the current sum, and a mean value and a variance of the equivalent threshold voltage.

$$\begin{cases} I_{H1} = I_{ds}(V_{gs} = V_{dd}, V_{ds} = V_{dd}) \\ I_{H2} = I_{ds}(V_{gs} = V_{dd}, V_{ds} = V_{ds}(\tau)) \\ I_L = I_{ds}\left(V_{gs} = V_{dd}, V_{ds} = \frac{V_{dd}}{2}\right) \\ k = \int_0^1 I_0 K_0 e^{K_1\left(\frac{V_{dd}x - V_{th} + \lambda V_{dd}}{n\phi_t}\right) + K_2\left(\frac{V_{dd}x - V_{th} + \lambda V_{dd}}{n\phi_t}\right)^2} dx \end{cases} \quad (1)$$

In Equation (1), $I_{ds}$ represents a source-drain current, $V_{gs}$ and $V_{ds}$ represent a gate-source voltage and a source-drain voltage, $V_{dd}$ represents a power supply voltage, $V_{ds}(\tau)$ represents a source-drain voltage at the input transition time, $\lambda$ represents a drain-induced source barrier lowering effect coefficient, n represents a sub-threshold slope factor, $\Phi_t$ represents a thermal voltage, $I_0$ represents a parameter affected by the process parameters, and $K_0$, $K_1$ and $K_2$ represent fitting coefficients determined by the process.

$$\begin{cases} \mu_Y = -k_2 E(\Delta V_{th}^2) + m E(\Delta V_{th}) - \ln(I_H + I_L) \\ \sigma_Y^2 = k_2^2 (E(\Delta V_{th'}^4) - E(\Delta V_{th'}^2)^2) \\ \gamma_1 = \left\{ \begin{array}{l} -k_2^3(\Delta V_{th'}^6) + 3k_2^2 E(\Delta V_{th'}^4)\left[\frac{m^2}{4k_2} - \ln(I_H + I_L)\right] - \\ 3k_2 E(\Delta V_{th'}^2)\left[\frac{m^2}{4k_2} - \ln(I_H + I_L)\right]^2 + \\ \left[\frac{m^2}{4k_2} - \ln(I_H + I_L)\right]^3 - 3\mu_Y \sigma_Y^2 - \mu_Y^3 \end{array} \right\} / \sigma_Y^3 \end{cases} \quad (2)$$

in Equation (2), m represents a coefficient, $k_2$ represents a fitting coefficient determined by the process, $\Delta V_{th}$ represents a threshold voltage fluctuation quantity, $\Delta V_{th'}$ represents a function of a threshold voltage, and $E[\cdot]$ represents a mean value of a corresponding random variable.

$$\begin{cases} I_{H1} = I_{ds}(V_g = V_{dd}, V_d = V_{dd}, V_s = V_{XH1}) \\ I_{H2} = I_{ds}(V_g = V_{dd}, V_d = V_d(\tau), V_s = V_{XH2}) \\ I_L = I_{ds}\left(V_g = V_{dd}, V_{dd} = \frac{V_{dd}}{2}, V_s = V_{XL}\right) \\ k = \int_0^{0.5} I_0 K_0 e^{k_1(V_{dd}x - V_{th} + \lambda V_{dd}) + k_2(V_{dd}x - V_{th} + \lambda V_{dd})^2} dx + \\ \int_{0.5}^1 I_0 K_0 e^{k_1\left(V_{dd}x - V_{th} - 2V_{XH}\left(x - \frac{1}{2}\right) + \lambda V_{dd}\right) + k_2\left(V_{dd}x - V_{th} - 2V_{XH}\left(x - \frac{1}{2}\right) + \lambda V_{dd}\right)^2} dx \end{cases} \quad (3)$$

In Equation (3), $V_g$ and $V_d$ represent a gate voltage and a drain voltage, $V_s$ represents a source voltage, $V_{XH}$ and $V_{XL}$ represent intermediate node voltages at different gate voltages and drain voltages, in the case of the ultra-fast input, $V_{XH}$ is $V_{XH1}$, which is an intermediate node voltage when the gate voltage and the drain voltage are both power supply voltages, in the case of the fast input, $V_{XH}$ is $V_{XH2}$, which is an intermediate node voltage when the gate voltage is a power supply voltage and the drain voltage is the intermediate node voltage of a drain voltage at the input transition time, $V_d(\tau)$ represents a drain voltage at the input transition time, and $k_1$ represents a fitting coefficient determined by the process.

$$\begin{cases} E(Y) = E(Y_1) + E(Y_2) \\ D(Y) = D(Y_1) + D(Y_2) + 2\mathrm{Cov}(Y_1, Y_2) \\ S_k(Y) = \dfrac{S_k(Y_1)D(Y_1)^{3/2} + S_k(Y_2)D(Y_2)^{3/2} + 3\mathrm{Cov}(Y_1, Y_2^2) + 3\mathrm{Cov}(Y_1^2, Y_2) - 6E(Y)\mathrm{Cov}(Y_1, Y_2)}{D(Y)^{3/2}} \end{cases} \quad (4)$$

In Equation (4), $D[\cdot]$ represents a variance of a corresponding random variable, $S_k[\cdot]$ represents a skewness of the corresponding random variable, and $\mathrm{Cov}[\cdot]$ represents a covariance of the corresponding random variable.

$$\Delta V_{th\_eff} = \frac{I_H}{I_H + I_L}\Delta V_{thH} + \frac{I_L}{I_H + I_L}\Delta V_{thL} \quad (5)$$

In Equation (5), $\Delta V_{th\_eff}$ represents an equivalent threshold voltage, and $\Delta V_{thH}$ and $\Delta V_{thL}$ represent linear functions of an upper transistor threshold voltage fluctuation quantity $\Delta V_{thU}$ and a lower transistor threshold voltage fluctuation quantity $\Delta V_{thD}$.

$$\begin{cases} I_{H1} = 2I_{ds}(V_{gs} = V_{dd}, V_{ds} = V_{dd}) \\ I_{H2} = 2I_{ds}(V_{gs} = V_{dd}, V_{ds} = V_{ds}(\tau)) \\ I_L = 2I_{ds}\left(V_{gs} = V_{dd}, V_{ds} = \frac{V_{dd}}{2}\right) \\ k = \int_0^1 I_0 K_0 e^{k_1(V_{dd}x - V_{th1} + \lambda V_{dd}) + k_2(V_{dd}x - V_{th1} + \lambda V_{dd})^2} \, dx + \\ \quad \int_0^1 I_0 K_0 e^{k_1(V_{dd}x - V_{th2} + \lambda V_{dd}) + k_2(V_{dd}x - V_{th2} + \lambda V_{dd})^2} \, dx \end{cases} \quad (6)$$

In Equation (6), $V_{th1}$ and $V_{th2}$ respectively represent threshold voltages of a left transistor and a right transistor in the parallel structure.

$$\begin{cases} E(Y) = E(Y_1) + E(Y_2) \\ D(Y) = D(Y_1) + D(Y_2) \\ S_k(Y) = \dfrac{S_k(Y_1)D(Y_1)^{3/2} + S_k(Y_2)D(Y_2)^{3/2}}{D(Y)^{3/2}} \end{cases} \quad (7)$$

$$\Delta V_{th\_eff} = \frac{\Delta V_{th1} + \Delta V_{th2}}{2} \quad (8)$$

In Equation (8), $\Delta V_{th1}$ and $\Delta V_{th2}$ represent threshold voltage fluctuation quantities of the left transistor and the right transistor in the parallel structure.

S3: A delay type is judged. The high current $I_{H1}$ under the ultra-fast input, the high current $I_{H2}$ under the fast input, the low current $I_L$ and the current integral k and the input transition time calculated in step S2 are respectively substituted into Equation (9) and Equation (10) according to the cell circuit type, so as to calculate an overshoot time $t_{ov}$ and a delay td, the magnitude relationship among the input transition time, the overshoot time and the delay is compared, and whether the delay type is the ultra-fast input, the fast input or the slow input is judged. If the input transition time is 50 ps, the calculated overshoot time $t_{ov}$, delay td and input transition time are compared, and it is found that the overshoot time $t_{ov}$ is greater than the input transition time and the delay td is greater than half of the input transition time, then the delay type is determined as the ultra-fast input. If the input transition time is 500 ps, the calculated overshoot time $t_{ov}$, delay td and input transition time are compared, and it is found that the overshoot time $t_{ov}$ is less than the input transition time and the delay td is greater than half of the input transition time, then the delay type is determined as the fast input. If the input transition time is 1 ns, the calculated overshoot time $t_{ov}$, delay td and input transition time are compared, and it is found that the overshoot time $t_{ov}$ is less than the input transition time and the delay td is less than half of the input transition time, then the delay type is determined as the slow input.

$$t_{ov} = \frac{2C_M}{C_M + C_L} \frac{C_L V_{dd}}{I_{H1} + I_L} + \left(1 - \frac{2C_L}{C_M + C_L} \frac{k}{I_{H1} + I_L}\right)\tau \quad (9)$$

In Equation (9), td represents a cell circuit delay, $\tau$ represents the input transition time, $C_M$ represents the coupling capacitance of input and output, and $C_L$ represents the load capacitance.

$$td = \left(1 + \frac{2C_M}{C_M + C_L}\right)\frac{C_L V_{dd}}{1_{H1} + I_L}\left(\frac{1}{2} - \frac{2C_L}{C_M + C_L}\frac{k}{I_{H2} + I_L}\right)\tau \quad (10)$$

S4: A cell circuit nominal delay model is established. The nominal delay is obtained according to the cell circuit type and the delay type. If the delay type is the ultra-fast input, the high current $I_{H1}$ under the ultra-fast input, the high current $I_{H2}$ under the fast input, the low current $I_L$ and the current integral k and the input transition time calculated in step S2 are substituted into Equation (10) to calculate the nominal delay. If the delay type is the fast input, the high current $I_{H1}$ under the ultra-fast input, the high current $I_{H2}$ under the fast input, the low current $I_L$ and the current integral k and the input transition time calculated in step S2 are substituted into Equation (11) to calculate the nominal delay. If the delay type is the slow input, the high current $I_{H1}$ under the ultra-fast input, the high current $I_{H2}$ under the fast input, the low current $I_L$ and the current integral k and the input transition time calculated in step S2 are substituted into Equation (12) to calculate the nominal delay.

$$td = \left(1 + \frac{2C_M}{C_M + C_L}\right)\frac{C_L V_{dd}}{1_{H1} + I_L}\left(\frac{1}{2} - \frac{2C_L}{C_M + C_L}\frac{k}{I_{H1} + I_L}\right)\tau \quad (11)$$

$$\frac{td}{\tau} = a \ln \frac{td_s}{\tau} + b \quad (12)$$

In Equation (12), $td_s$ represents a step delay, and a and b represent fitting parameters.

S5: A cell circuit statistical delay model is established. Delay statistics: a variance, a maximum value and a minimum value are obtained based on the cell circuit nominal delay model according to the cell circuit type and the delay type. If the delay type is the ultra-fast input, the mean value $\mu_Y$, the variance $\sigma_Y^2$ and the skewness $\gamma_1$ of the logarithm of the sum of the high current and the low current obtained in step S2 are substituted into Equation (13) to calculate distribution parameters: a location parameter $\xi_Y$, a scale parameter $\omega_Y$ and a second shape parameter $\beta_Y$, the distribution parameters are substituted into Equation (14) to calculate a variance D(td) of the delay, and the distribution parameters are substituted into Equation (15) to calculate a maximum value $td_{max}$ and a minimum value $td_{min}$ of the delay. If the delay type is the fast input, the mean value $\mu_Y$, the variance $\sigma_Y^2$ and the skewness $\gamma_1$ of the logarithm of the sum of the high current and the low current obtained in step S2 are substituted into Equation (13) to calculate distribution parameters: a location parameter $\xi_Y$, a scale parameter $\omega_Y$ and a second shape parameter $\beta_Y$, the distribution parameters are substituted into Equation (14) to calculate a variance D(td) of the delay, and the distribution parameters are substituted into Equation (15) to calculate a maximum value $td_{max}$ and a minimum value $td_{min}$ of the delay. If the delay type is the slow input, the mean value and the variance of the equivalent threshold voltage obtained in step S2 are substituted into Equation (16) to calculate a mean value E(td), a variance D(td) and a skewness $S_k$(td) of the delay, the mean value E(td), the variance D(td) and the skewness $S_k$(td) of the delay are substituted into Equation (13) to calculate distribution parameters: a location parameter $\xi_{td}$, a scale parameter $\omega_{td}$ and a second shape parameter $\beta_{td}$, and the distribution parameters are substituted into Equation (17) to calculate a maximum value $td_{max}$ and a minimum value $td_{min}$ of the delay.

$$\varepsilon_Y = \mu_Y - \omega_Y \beta_Y \sqrt{\frac{2}{\pi}}$$

$$\omega_Y = \sqrt{\frac{\sigma_Y^2}{1 - \frac{2}{\pi}\beta_Y^2}}$$

$$\beta_Y = \sqrt{\frac{\pi}{2} \frac{\left(\frac{2\gamma_1}{4-\pi}\right)^{2/3}}{1 + \left(\frac{2\gamma_1}{4-\pi}\right)^{2/3}}}$$

$$D(td) = \qquad (14)$$
$$\left[\left(1 + \frac{2C_M}{C_M + C_L}\right)C_L V_{dd}\right]^2 \times 2e^{2\varepsilon_Y}e^{\omega_Y^2}\left(e^{\omega_Y^2}\phi(2\beta_Y\omega_Y) - 2\phi^2(\beta_Y\omega_Y)\right)$$

$$\begin{cases} td_{max} = \left(1 + \frac{2C_M}{C_M + C_L}\right)C_L V_{dd} e^{\varepsilon_Y + 3.21\omega_Y} + M\tau \\ td_{min} = \left(1 + \frac{2C_M}{C_M + C_L}\right)C_L V_{dd} e^{\varepsilon_Y - 1.79\omega_Y} + M\tau \end{cases} \qquad (15)$$

In Equation (14), φ(·) represents a cumulative density distribution function of standard normal distribution.

$$\begin{cases} E(td) = p_2 E(\Delta V_{th}^2) - p_0 \\ D(td) = p_3^2 E(\Delta V_{th}^6) + (2p_3 p_1 + p_2^2)E(\Delta V_{th}^4) + \\ \quad (2p_2 p_0 + p_1^2)E(\Delta V_{th}^2) + p_0^2 \\ \quad q_8 E(\Delta V_{th}^8) + q_6 E(\Delta V_{th}^6) + q_4 E(\Delta V_{th}^4) + \\ S_k(td) = \frac{q_2 E(\Delta V_{th}^2) + q_0 - 3E(td)D(td) - E(td)^3}{D(td)^{3/2}} \end{cases} \qquad (16)$$

In Equation (16), $p_i$ (i=0,1,2,3) and $q_i$ (i=0,2,4,6,8) represent coefficients, which are functions of threshold voltages and currents.

$$\begin{cases} td_{max} = \varepsilon_{td} + 3.21\omega_{td} \\ td_{min} = \varepsilon_{td} + 1.79\omega_{td} \end{cases} \qquad (17)$$

Figure 2:
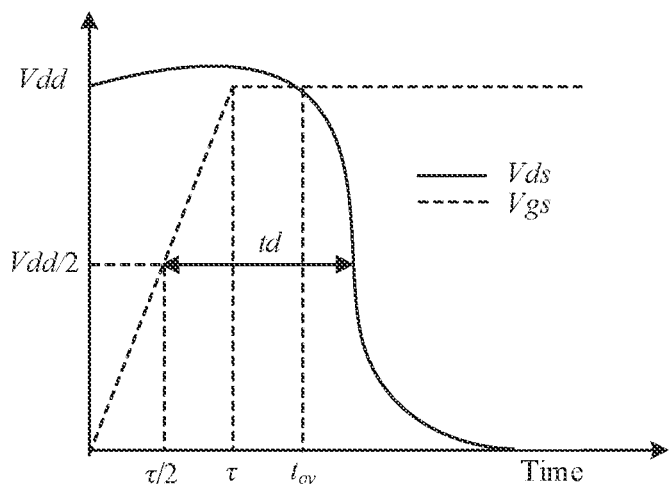
FIG. 2 shows classification situations of delay types of a near-threshold cell circuit in a specific embodiment of the present invention, where (a) shows the situation that the delay type is ultra-fast input; (b) shows the situation that the delay type is fast input; and (c) shows the situation that the delay type is slow input.
Figure 2:
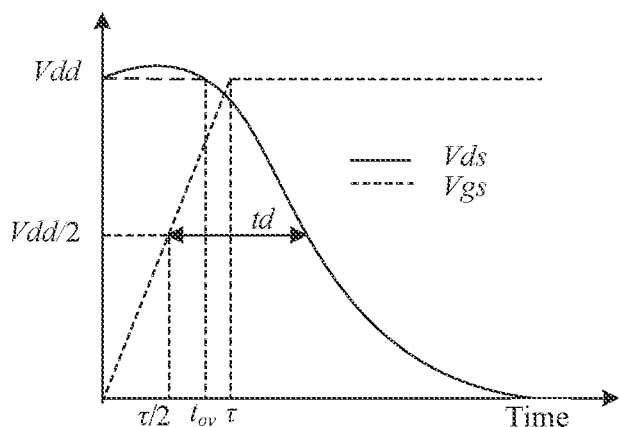
Figure 2:
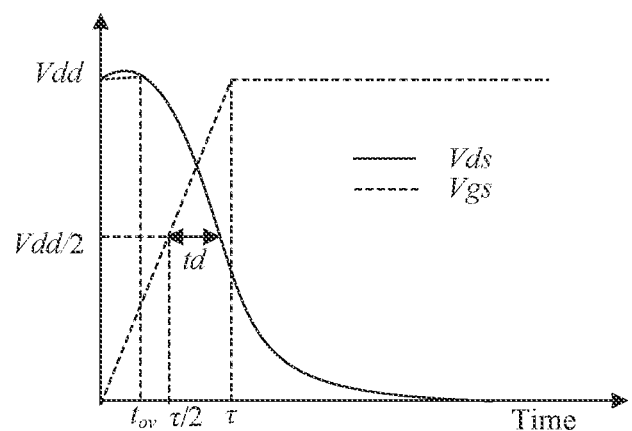

FIG. 2 shows classification situations of delay types of a near-threshold cell circuit in a specific embodiment of the present invention, In FIG. 2(a), the delay type is the ultra-fast input, the overshoot time is greater than the input transition time, and the delay is greater than half of the input transition time. In FIG. 2(b), the delay type is the fast input, the overshoot time is less than the input transition time, and the delay is greater than half of the input transition time. In FIG. 2(c), the delay type is the slow input, the overshoot time is less than the input transition time, and the delay is less than half of the input transition time.

What is claimed is:

1. A near-threshold cell circuit delay modeling method, wherein a cell circuit comprises inverters, stacked structure cells and parallel structure cells, and the modeling method comprises the following steps:
   S1: obtaining parameters which comprises process parameters of each transistor of the cell circuit, cell circuit parameters and delay parameters with slow input transition;
   S2: judging a cell circuit type which comprises judging whether the cell circuit is an inverter, a stacked structure cell or a parallel structure cell, calculating a high current, a low current and a current integral of the cell circuit according to the cell circuit type, calculating a mean value, a variance and a skewness of a natural logarithm of a sum of the high current and the low current, and calculating a mean value and a variance of an equivalent threshold voltage;
   S3: judging a delay type which comprises calculating an overshoot time and a delay of the cell circuit according to the cell circuit type obtained in step S2, and then, judging whether the delay type is ultra-fast input transition, fast input transition or slow input transition according to a relative magnitude relationship among the overshoot time, the delay and an input transition time; wherein if the overshoot time is greater than the input transition time, determining the delay type as the ultra-fast input transition; if the overshoot time is less than the input transition time and the delay is greater than half of the input transition time, determining the delay type as the fast input transition; if the overshoot time is less than the input transition time and the delay is less than half of the input transition time, determining the delay type as the slow input transition;
   S4: establishing a cell circuit nominal delay model according to the cell circuit type obtained in step S2 and the delay type obtained in step S3, and obtaining a nominal delay for the cell circuit;
   S5: based on the nominal delay model, establishing a cell circuit statistical delay model according to the cell circuit type obtained in step S2 and the delay type obtained in step S3, and obtaining delay statistics for the cell circuit which comprises a variance, a maximum value and a minimum value; and
   S6: designing and/or analyzing an integrated circuit based on the established cell circuit statistical delay model and the obtained delay statistics.

2. The near-threshold cell circuit delay modeling method according to claim 1, wherein in step S1, the process parameters comprise a sub-threshold slope factor and a drain-induced source barrier lowering effect coefficient, the circuit parameters comprise a transistor size, a load, an input transition time, a power supply voltage, a temperature and a process, the delay parameters of slow input transition comprise fitting parameters a and b in Equation (1) and fitting parameters c and d in Equation (2), wherein the fitting parameters a, b, c and d are obtained by fitting the delay under the slow input transition obtained by simulation, wherein Equation (1) is defined as:

$$\frac{td}{\tau} = a\ln\frac{td_s}{\tau} + b$$

wherein Equation (2) is defined as:

$$a = cV_{th} + d$$

wherein in Equation (1), td represents a cell circuit delay, τ represents the input transition time, and $td_s$ represents a step delay; and in Equation (2), $V_{th}$ represents a threshold voltage.

3. The near-threshold cell circuit delay modeling method according to claim 1, wherein in step S2, if the cell circuit is the inverter, step S2 further comprises:
   S21: calculating a high current $I_H$, a low current $I_L$ and the current integral k of the cell circuit by Equation (3), wherein in the case of the ultra-fast input transition, the high current $I_H$ is a high current $I_{H1}$ under the ultra-fast input transition, which is a source-drain current when a gate-source voltage and a source-drain voltage are both power supply voltages; in the case of the fast input transition, the high current $I_H$ is the high current $I_{H2}$ under the fast input transition, which is a source-drain current when the gate-source voltage is a power supply voltage and the source-drain voltage is a source-drain voltage at the input transition time;

wherein Equation (3) is defined as:

$$\begin{cases} I_{H1} = I_{ds}(V_{gs} = V_{dd}, V_{ds} = V_{dd}) \\ I_{H2} = I_{ds}(V_{gs} = V_{dd}, V_{ds}(\tau)) \\ I_L = I_{ds}\left(V_{gs} = V_{dd}, V_{ds} = \frac{V_{dd}}{2}\right) \\ k = \int_0^1 I_0 K_0 e^{K_1\left(\frac{V_{dd}x - V_{th} + \lambda V_{dd}}{n\phi_1}\right) + K_2\left(\frac{V_{dd}x - V_{th} + \lambda V_{dd}}{n\phi_1}\right)^2} dx \end{cases}$$

wherein in Equation (3), $V_{gs}$ and $V_{ds}$ represent a gate-source voltage and a source-drain voltage, respectively, $I_{ds}$ represents a source-drain current, $V_{dd}$ represents a power supply voltage, $V_{ds}(\tau)$ represents a source-drain voltage at the input transition time and is calculated by Equation (4), $\lambda$ represents a drain-induced source barrier lowering effect coefficient, n represents a sub-threshold slope factor, $\Phi_t$ represents a thermal voltage, $I_0$ represents a parameter affected by the process parameters, and $K_0$, $K_1$ and $K_2$ represent fitting coefficients determined by the process;

wherein Equation (4) is defined as:

$$V_{ds}(\tau) = \frac{C_M}{C_M + C_L} V_{dd} - \frac{k}{C_M + C_L} + V_{dd}$$

wherein in Equation (4), $C_M$ represents a coupling capacitance of input and output, and $C_L$ represents a load capacitance;

S22: expressing a natural logarithm Y of the sum of the high current and the low current, namely $I_H + I_L$, as Equation (5), and calculating a mean value $\mu_Y$, a variance $\sigma_Y^2$ and a skewness $\gamma_1$ of the logarithm Y of the current sum by Equation (6), wherein Equation (5) is defined as:

$$Y = \ln(I_H + I_L)$$

wherein Equation (6) is defined as:

$$\begin{cases} \mu_Y = -k_2 E(\Delta V_{th}^2) + mE(\Delta V_{th}) - \ln(I_H + I_L) \\ \sigma_Y^2 = k_2^2 \left( E(\Delta V_{th'}^4) - E(\Delta V_{th'}^2)^2 \right) \\ \gamma_1 = \left\{ \begin{array}{c} -k_2^3 E(\Delta V_{th'}^6) + 3k_2^2 E(\Delta V_{th'}^4)\left[\frac{m^2}{4k_2} - \ln(I_H + I_L)\right] - \\ 3k_2 E(\Delta V_{th'}^2)\left[\frac{m^2}{4k_2} - \ln(I_H + I_L)\right]^2 + \\ \left[\frac{m^2}{4k_2} - \ln(I_H + I_L)\right]^3 = 3\mu_Y \sigma_Y^2 - \mu_Y^3 \end{array} \right\} / \sigma_Y^3 \end{cases}$$

wherein in Equation (6), m represents a coefficient, m is calculated by Equation (7) under the ultra-fast input, m is calculated by Equation (8) under the fast input, $k_2$ represents a fitting coefficient determined by the process, $\Delta V_{th}$ represents a threshold voltage fluctuation quantity, $\Delta V_{th'}$ is calculated by Equation (9), and $E[\cdot]$ represents a mean value of a corresponding random variable;

wherein Equation (7) is defined as:

$$m = k_1 + 2k_2(V_{dd} - V_{th0} + \lambda V_{dd}/2) + \frac{I_H}{I_H + I_L} k_2 \lambda V_{dd}$$

wherein in Equation (7), $k_1$ represents a fitting coefficient determined by the process, and $V_{th0}$ represents a nominal value of threshold voltage;

wherein Equation (8) is defined as:

$$m = k_1 + 2k_2(V_{dd} - V_{th0} + \lambda V_{dd}/2) + \frac{I_H}{I_H + I_L} k_2 \lambda [2V_{ds}(\tau) - V_{dd}]$$

wherein Equation (9) is defined as:

$$\Delta V_{th'} = \Delta V_{th} - \frac{m}{2k_2}.$$

4. The near-threshold cell circuit delay modeling method according to claim 1, wherein in step S2, if the cell circuit is the stacked structure cell, step S2 further comprises:

S21: calculating a high current $I_{H1}$ under the ultra-fast input and a high current $I_{H2}$ under the fast input, a low current $I_L$ and a current integral k by Equation (10), wherein Equation (10) is defined as:

$$\begin{cases} I_{H1} = I_{ds}(V_g = V_{dd}, V_d = V_{dd}, V_s = V_{XH1}) \\ I_{H2} = I_{ds}(V_g = V_{dd}, V_d = V_d(\tau), V_s = V_{XH2}) \\ I_L = I_{ds}\left(V_g = V_{dd}, V_d = \frac{V_{dd}}{2}, V_s = V_{XL}\right) \\ k = \int_0^{0.5} I_0 K_0 e^{k_1(V_{dd}x - V_{th} + \lambda V_{dd}) + k_2(V_{dd}x - V_{th} + \lambda V_{dd})^2} dx + \\ \int_0^{0.5} I_0 K_0 e^{k_1\left(V_{dd}x - V_{th} + 2V_{XH}\left(x - \frac{1}{2}\right) + \lambda V_{dd}\right)+} \\ k_2\left(V_{dd}x - V_{th} + 2V_{XH}\left(x - \frac{1}{2}\right) + \lambda V_{dd}\right)^2 dx \end{cases}$$

wherein in Equation (10), $V_g$ and $V_d$ represent a gate voltage and a drain voltage, respectively, $V_s$ represents a source voltage, $V_{XH}$ and $V_{XL}$ represent intermediate node voltages at different gate voltages and drain voltages, respectively, in the case of the ultra-fast input, $V_{XH}$ is $V_{XH1}$, which is an intermediate node voltage when the gate voltage and the drain voltage are both power supply voltages, in the case of the fast input, $V_{XH}$ is $V_{XH2}$, which is an intermediate node voltage when the gate voltage is a power supply voltage and the drain voltage is an intermediate node voltage of the drain voltage at the input transition time and is calculated by Equation (11), and $V_d(\tau)$ represents a drain voltage at the input transition time;

wherein Equation (11) is defined as:

$$\begin{cases} V_{XH1} = \dfrac{V_{thD} - V_{thU} + \lambda V_{dd}}{(1+2\lambda)} + \\ \qquad \dfrac{\ln\left(\dfrac{W_U}{W_D}\right) - m_2}{(1+2\lambda)[k_1 + k_2(2V_{dd} - V_{thU} - V_{thD} + \lambda V_{dd})]} \\ V_{XH2} = \dfrac{V_{thD} - V_{thU} + \lambda V_d(\tau)}{(1+2\lambda)} + \\ \qquad \dfrac{\ln\left(\dfrac{W_U}{W_D}\right) - m_2}{(1+2\lambda)[k_1 + k_2(2V_{dd} - V_{thU} - V_{thD} + \lambda V_d(\tau))]} \\ V_{XL} = \dfrac{V_{thD} - V_{thU} + \lambda V_{dd}/2}{(1+2\lambda)} + \\ \qquad \dfrac{\ln\left(\dfrac{W_U}{W_D}\right) - m_2}{(1+2\lambda)[k_1 + k_2(2V_{dd} - V_{thU} - V_{thD} + \lambda V_{dd}/2)]} \end{cases}$$

wherein in Equation (11), $V_{thU}$ and $V_{thD}$ represent an upper transistor threshold voltage and a lower transistor threshold voltage in the stacked structure cell, respectively, $W_U$ and $W_D$ represent an upper transistor width and a lower transistor width in the stacked structure cell, respectively, and $m_2$ represents a fitting coefficient;

S22: calculating a mean value $E(Y)$, a variance $D(Y)$ and a skewness $S_k(Y)$ of the logarithm Y of the current sum by Equation (12), wherein Equation (12) is defined as:

$$\begin{cases} E(Y) = E(Y_1) + E(Y_2) \\ D(Y) = D(Y_1) + D(Y_2) + 2\mathrm{Cov}(Y_1, Y_2) \\ S_k(Y) = \dfrac{S_k(Y_1)D(Y_1)^{3/2} + S_k(Y_2)D(Y_2)^{3/2} + 3\mathrm{Cov}(Y_1, Y_2^2) + 3\mathrm{Cov}(Y_1^2, Y_2) - 6E(Y)\mathrm{Cov}(Y_1, Y_2)}{D(Y)^{3/2}} \end{cases}$$

wherein in Equation (12), $D[\cdot]$ represents a variance of a corresponding random variable, $S_k[\cdot]$ represents a skewness of the corresponding random variable, $\mathrm{Cov}[\cdot]$ represents a covariance of the corresponding random variable, and $Y_1$ and $Y_2$ can be calculated by Equation (13);

wherein Equation (13) is defined as:

$$\begin{cases} Y_1 = \left(-k_2 \Delta V_{thH}^2 + \Delta V_{thH} m - \ln(I_H + I_L)\right)\dfrac{I_H}{I_H + I_L} \\ Y_2 \left(-k_2 \Delta V_{thL}^2 + \Delta V_{thL} m - \ln(I_H + I_L)\right)\dfrac{I_L}{I_H + I_L} \end{cases}$$

wherein in Equation (13), $\Delta V_{thH}$ and $\Delta V_{thL}$ represent linear functions of an upper transistor threshold voltage fluctuation quantity $\Delta V_{thU}$ and a lower transistor threshold voltage fluctuation quantity $\Delta V_{thD}$, respectively, expressed as Equation (14), and $\alpha_1$, $\alpha_2$, $\alpha_3$ and $\alpha_4$ in Equation (14) represent coefficients;

wherein Equation (14) is defined as:

$$\begin{cases} \Delta V_{thH} = (1 + \alpha_1)\Delta V_{thU} + \alpha_2 \Delta V_{thD} \\ \Delta V_{thL} = (1 + \alpha_3)\Delta V_{thU} + \alpha_4 \Delta V_{thD} \end{cases}$$

S23: calculating a mean value and a variance of an equivalent threshold voltage $\Delta V_{th\_eff}$ by Equation (15), wherein Equation (15) is defined as:

$$\Delta V_{\mathrm{th\_eff}} = \dfrac{I_H}{I_H + I_L}\Delta V_{thH} + \dfrac{I_L}{I_H + I_L}\Delta V_{thL}.$$

5. The near-threshold cell circuit delay modeling method according to claim 1, wherein in step S2, if the cell circuit is the parallel structure cell, step S2 further comprises:

S21: calculating a high current $I_{H1}$ under the ultra-fast input and a high current $I_{H2}$ under the fast input, a low current $I_L$ and a current integral k by Equation (16), wherein Equation (16) is defined as:

$$\begin{cases} I_{H1} = 2I_{ds}(V_{gs} = V_{dd}, V_{ds} = V_{dd}) \\ I_{H2} = 2I_{ds}(V_{gs} = V_{dd}, V_{ds} = V_{ds}(\tau)) \\ I_L = 2I_{ds}\left(V_{gs} = V_{dd}, V_{ds} = \dfrac{V_{dd}}{2}\right) \\ k = \displaystyle\int_0^1 I_0 K_0 E^{k_1(V_{dd}x - V_{th1} + \lambda V_{dd}) + k_2(V_{dd}x - V_{th} + 2V_{dd})^2} dx + \\ \displaystyle\int_0^1 I_0 K_0 e^{k_1(V_{dd}x - V_{th2} + \lambda V_{dd}) + k_2(V_{dd}x - V_{th2} + \lambda V_{dd})^2} dx \end{cases}$$

wherein in Equation (16), $V_{gs}$ and $V_{ds}$ represent a gate-source voltage and a source-drain voltage, respectively, $I_{ds}$ represents a source-drain current, $V_{dd}$ represents a power supply voltage, $\tau$ represents the input transition time, $\lambda$ represents a drain-induced source barrier lowering effect coefficient, $I_0$ represents a parameter affected by the process parameters, and $K_0$, $K_1$ and $K_2$ represent fitting coefficients determined by the process, $V_{th1}$ and $V_{th2}$ respectively represent threshold voltages of a left transistor and a right transistor in the parallel structure;

S22: calculating a mean value $E(Y)$, a variance $D(Y)$ and a skewness $S_k(Y)$ of the logarithm Y of the current sum by Equation (17), wherein Equation (17) is defined as:

$$\begin{cases} E(Y) = E(Y_1) + E(Y_2) \\ D(Y) = D(Y_1) + D(Y_2) \\ S_k(Y) = \dfrac{S_k(Y_1)D(Y_1)^{3/2} + S_k(Y_2)D(Y_2)^{3/2}}{D(Y)^{3/2}} \end{cases}$$

wherein in Equation (17), $Y_1$ and $Y_2$ can be calculated by Equation (18);

wherein Equation (18) is defined as:

$$\begin{cases} Y_1 = \dfrac{1}{2}\left(-k_2 \Delta V_{th1}^2 + \Delta V_{th1} m - \ln(I_H + I_L)\right) \\ Y_2 = \dfrac{1}{2}\left(-k_2 \Delta V_{th2}^2 + \Delta V_{th2} m - \ln(I_H + I_L)\right) \end{cases}$$

in Equation (18), $\Delta V_{th1}$ and $\Delta V_{th2}$ respectively represent threshold voltage fluctuation quantities of the left transistor and the right transistor in the parallel structure;

S23: calculating a mean value and a variance of an equivalent threshold voltage $\Delta V_{th\_eff}$ by Equation (19), wherein Equation (19) is defined as:

$$\Delta V_{th\_eff} = \frac{\Delta V_{th1} + \Delta V_{th2}}{2}.$$

6. The near-threshold cell circuit delay modeling method according to claim 1, wherein the step S3 to determine the delay type comprises calculating an overshoot time $t_{ov}$ and a delay td according to the cell circuit type, comparing the magnitude relationship among the input transition time, the overshoot time and the delay, and judging whether the input is ultra-fast input, fast input or slow input, and specifically comprises:

S31: substituting the high current $I_{H1}$ under the ultra-fast input and the high current $I_{H2}$ under the fast input, the low current $I_L$ and the current integral k obtained in step S2 into Equation (20) to calculate the overshoot time $t_{ov}$, and substituting the variables into Equation (21) to calculate the delay td;

wherein Equation (20) is defined as:

$$t_{ov} = \frac{2C_M}{C_M + C_L} \frac{C_L V_{dd}}{I_{H1} + I_L} + \left(1 - \frac{2C_L}{C_M + C_L} \frac{k}{I_{H1} + I_L}\right)\tau$$

wherein Equation (21) is defined as:

$$td = \left(1 + \frac{2C_M}{C_M + C_L}\right)\frac{C_L \nabla_{dd}}{I_{H2} + I_L} + \left(\frac{1}{2} - \frac{2C_L}{C_M + C_L} \frac{k}{I_{H2} + I_L}\right)\tau$$

wherein in Equation (20), $C_M$ represents a coupling capacitance of input and output, and $C_L$ represents a load capacitance, $V_{dd}$ represents a power supply voltage, k represents the current integral, $\tau$ represents the input transition time;

S32: comparing the overshoot time $t_{ov}$ with the input transition time $\tau$, if $t_{ov} > \tau$, determining the input as the ultra-fast input, otherwise, determining the input as the fast input or the slow input;

S33: comparing the delay td with half of the input transition time $\tau/2$, if $td > \tau/2$, determining the input as the fast input, otherwise, determining the input as the slow input.

7. The near-threshold cell circuit delay modeling method according to claim 1, wherein in step S4, establishing the cell circuit nominal delay model comprises obtaining a delay nominal delay according to the cell circuit type and the delay type, wherein if the delay type is the ultra-fast input, the nominal delay is calculated by Equation (22); if the delay type is the fast input, the nominal delay is calculated by Equation (21); and if the delay type is the slow input, the nominal delay is calculated by Equation (1), wherein Equation (22) is defined as:

$$td = \left(1 + \frac{2C_M}{C_M + C_L}\right)\frac{C_L V_{dd}}{I_{H1} + I_L} + \left(\frac{1}{2} - \frac{2C_L}{C_M + C_L} \frac{k}{I_{H1} + I_L}\right)\tau.$$

wherein in Equation (22), $C_M$ represents a coupling capacitance of input and output, and $C_L$ represents a load capacitance, $V_{dd}$ represents a power supply voltage, k represents the current integral, $\tau$ represents the input transition time, $I_{H1}$ is a high current, $I_L$ a low current.

8. The near-threshold cell circuit delay modeling method according to claim 1, wherein in step S5, establishing the cell circuit statistical delay model comprises obtaining delay statistics: a variance, a maximum value and a minimum value based on the nominal delay model in step S4 according to the cell circuit type and the delay type, wherein if the delay type is the ultra-fast input, step S5 further comprises:

S51: based on the properties of logarithm skewed normal distribution, substituting the mean value $\mu_Y$, the variance $\sigma_Y^2$ and the skewness $\gamma_1$ of the logarithm of the current sum obtained in step S2 into Equation (23) to calculate distribution parameters: a location parameter $\xi_Y$, a scale parameter $\omega_Y$ and a second shape parameter $\beta_Y$, wherein Equation (23) is defined as:

$$\begin{cases} \varepsilon_Y = \mu_Y - \omega_Y \beta_Y \sqrt{\frac{2}{\pi}} \\ \omega_Y = \sqrt{\frac{\sigma_Y^2}{1 - \frac{2}{\pi}\beta_Y^2}} \\ \beta_Y = \sqrt{\frac{\pi\left(\frac{2\gamma_1}{4-\pi}\right)^{\frac{2}{3}}}{2\left(1 + \left(\frac{2\gamma_1}{4-\pi}\right)^{\frac{2}{3}}\right)}} \end{cases}$$

S52: based on the distribution parameters, calculating a variance D(td) of the delay by Equation (24), and calculating a maximum value $td_{max}$ and a minimum value $td_{min}$ of the delay by Equation (25), wherein Equation (24) is defined as:

$$D(td) = \left[\left(1 + \frac{2C_M}{C_M + C_L}\right)C_L V_{dd}\right]^2 \times 2e^{2\varepsilon_Y} e^{\omega_Y^2}\left(e^{\omega_Y^2}\phi(2\beta_Y\omega_Y) - 2\phi^2(\beta_Y\omega_Y)\right)$$

wherein Equation (25) is defined as:

$$\begin{cases} td_{max} = \left(1 + \frac{2C_M}{C_M + C_L}\right)C_L V_{dd} e^{\varepsilon_Y + 3.21\omega_Y} + \left(\frac{1}{2} - \frac{2C_L}{C_M + C_L} \frac{k}{I_{H2} + I_L}\right)\tau \\ td_{min} = \left(1 + \frac{2C_M}{C_M + C_L}\right)C_L V_{dd} e^{\varepsilon_Y - 1.79\omega_Y} + \left(\frac{1}{2} - \frac{2C_L}{C_M + C_L} \frac{k}{I_{H2} + I_L}\right)\tau \end{cases}$$

wherein in Equation (24), $C_M$ represents a coupling capacitance of input and output, and $C_L$ represents a load capacitance, $V_{dd}$ represents a power supply voltage, $\omega(\cdot)$ represents a cumulative density distribution function of standard normal distribution, wherein in Equation (25), k represents the current integral, τ represents the input transition time, $I_H$ is a high current, $I_L$ a low current, $\omega_Y$ is a scale parameter, $\xi_Y$ is a location parameter.

9. The near-threshold cell circuit delay modeling method according to claim 8, wherein in step S2, if the delay type is the fast input, step S5 further comprises:

S51: based on the properties of logarithm skewed normal distribution, substituting the mean value $\mu_Y$, the variance $\sigma_Y^2$ and the skewness $\gamma_1$ of the logarithm of the current sum obtained in step S2 into Equation (23) to calculate distribution parameters: a location parameter $\xi_Y$, a scale parameter $\omega_Y$ and a second shape parameter $\beta_Y$;

S52: based on the distribution parameters, calculating a variance D(td) of the delay by Equation (24), and calculating a maximum value $td_{max}$ and a minimum value $td_{min}$ of the delay by Equation (25).

10. The near-threshold cell circuit delay modeling method according to claim 8, wherein in step S2, if the delay type is the slow input, step S5 further comprises:

S51: based on the mean value and the variance of the equivalent threshold voltage obtained in step S2, calculating a mean value E(td), a variance D(td) and a skewness $S_k$(td) of the delay by Equation (26), wherein Equation (26) is defined as:

$$\begin{cases} E(td) = p_2 E(\Delta V_{th}^2) + p_0 \\ D(td) = p_3^2 E(\Delta V_{th}^6) + \\ \quad (2p_3 p_1 + p_2^2) E(\Delta V_{th}^4) + (2p_2 p_0 + p_1^2) E(\Delta V_{th}^2) + p_0^2 \\ \quad (q_8(\Delta V_{th}^8) + q_6 E(\Delta V_{th}^6) + q_4 E(\Delta V_{th}^4) + q_2 E(\Delta V_{th}^2) + \\ S_k(td) = \dfrac{q_0 - 3E(td)D(td) - E(td)^3)}{D(td)^{3/2}} \end{cases}$$

wherein in Equation (26), $E(\Delta V_{th})$ represents a mean value of a threshold voltage fluctuation quantity, $p_i$(i=0, 1,2,3) and $q_i$(i=0,2,4,6,8) represent coefficients, which are functions of threshold voltages and currents;

S52: based on the properties of skewed normal distribution, calculating distribution parameters: a location parameter $\xi_{td}$, a scale parameter $\omega_{td}$ and a second shape parameter $\beta_{td}$ of the delay by Equation (23);

S53: based on the distribution parameters, calculating a maximum value $td_{max}$ and a minimum value $td_{min}$ of the delay by Equation (27), wherein Equation (27) is defined as:

$$\begin{cases} td_{max} = \varepsilon_{td} + 3.21\omega_{td} \\ td_{min} = \varepsilon_{td} - 1.79\omega_{td} \end{cases}.$$

\* \* \* \* \*